Oct. 18, 1927.

F. S. CARR 1,646,368

LOCK NUT FASTENING INSTALLATION

Filed March 6, 1926

Inventor:
Fred S. Carr,
by Emery, Booth, Janney & Varney
Attys.

Patented Oct. 18, 1927.

1,646,368

UNITED STATES PATENT OFFICE.

FRED S. CARR, OF NEWTON, MASSACHUSETTS, ASSIGNOR TO CARR FASTENER COMPANY, OF CAMBRIDGE, MASSACHUSETTS, A CORPORATION OF MAINE.

LOCK-NUT-FASTENING INSTALLATION.

Application filed March 6, 1926. Serial No. 92,720.

This invention aims to provide an improved lock nut fastening installation.

In the drawings, which illustrate a preferred embodiment of my invention:—

Figure 1:
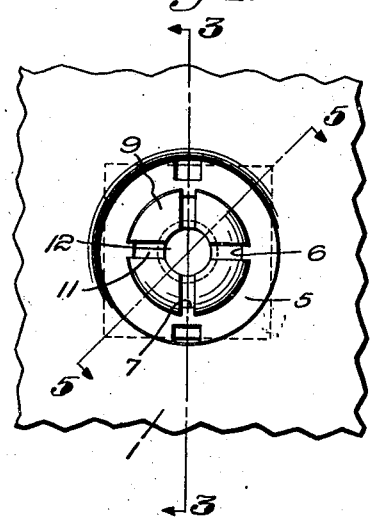
Figure 1 is a front elevation of the nut secured to its support.

Referring to the drawings, I have shown a lock nut installation comprising a rigid supporting part 1, a resilient nut 2, a part 3 to be secured to the support 1 and a fastening element such as a screw 4 for engagement with the nut 2. This type of installation is particularly, though not exclusively, adapted for use in motor vehicle body construction where locks, hinges, metal plates and the like are to be secured to the metal body. This type of installation is particularly useful where the inner face of the nut support 1 is accessible before the part 3 is placed in position.

Figure 4:
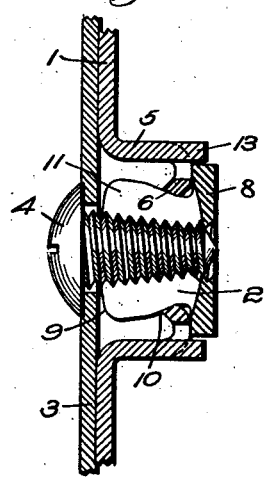
Fig. 4 is a section showing the parts shown in Fig. 3 secured together.

For illustrative purposes and convenience in drawing, I have shown two thin sheet metal plates 1 and 3 secured together by the nut 2 and screw 4, as shown in Fig. 4.

Figure 3:
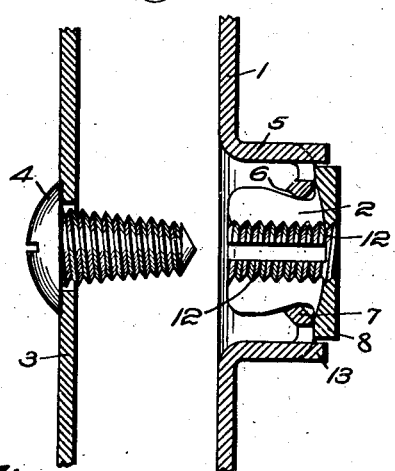
Fig. 3 is a section on the line 3—3 of Fig. 1, also showing the part to be secured to the nut support and the screw for engagement with the nut.
Figure 5:
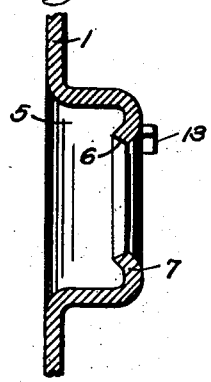
Fig. 5 is a section on the line 5—5 of Fig. 1, the nut being omitted.
Figure 6:
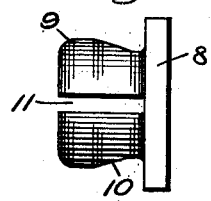
Fig. 6 is a side elevation of the preferred form of nut.

The nut support 1 is pre-formed by pressing a recessed portion 5 inwardly from the outer face. In the bottom of the recess, I provide an aperture surrounded by a wall 6 located between the plane of the bottom of the recessed portion 5 and the outer face of the support 1, as shown in Figs. 3, 4 and 5. This is provided by pressing a portion 7 of the bottom of the recessed portion 5 toward the support 1 and then forming the aperture in the pressed-out portion 7.

Figure 2:
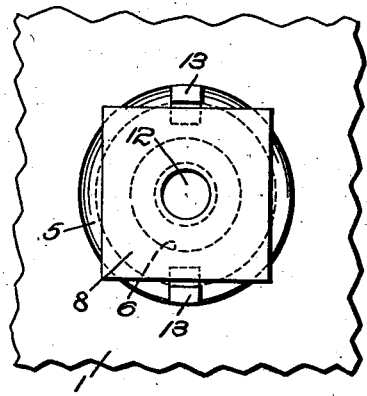
Fig. 2 is a rear elevation of the nut and support.

The nut 2 is formed from a single piece of metal and has a base 8 from which extends a head 9 and neck 10. The head and neck are divided by cross slots 11 which extend from the head a slight distance into the base to permit contraction and expansion of the head and neck. By extending the slots into the base, the material of the base is thinned where the neck joins the base so that greater resiliency is provided to the head and neck, thereby reducing the possibility of the portions of the head and neck becoming set. The nut is also provided with a threaded hole 12 extending through the axis thereof as shown in Fig. 2.

In assembling the nut 2 with its support 1, it is snapped through the aperture in the recessed portion 5 from the rear side of the support, so that the head enters the recess and the base seats against the base of the recessed portion, as shown in Fig. 3. In its normal condition, the head 9 of the nut is slightly larger in diameter than the aperture so that, as it passes the wall 6, it contracts, then expands after passing therethrough and is held in initial assembly with the support 1 by its own resiliency.

When securing the part 3 to the support 1, the screw 4 is inserted through an aperture in the part 3 and engaged with the nut by turning the screw. The shank of the screw is preferably tapered so that, as it threads its way into engagement with the nut, it expands the head 9 of the nut and forces the neck tightly against the wall 6, as shown in Fig. 5.

It will readily be understood that the gripping action between the neck and the wall 6 is more effective when the wall 6 is out of the plane of the bottom of the recessed portion 5 than it would be in the same plane because of greater expansion of the nut in that plane. Therefore, when the part 3 is clamped tightly against the part 1, the gripping action between the wall 7 and the neck 10 of the nut, together with the tight grip between the threads of the nut and of the screw, effectively prevents accidental unscrewing of the screw from the nut. The base 8 of the nut, being larger in diameter than the neck 10, engages the bottom of the depressed portion and prevents the nut from passing entirely through the aperture in the recessed portion.

To prevent turning of the nut during the assembling operation, I provide fingers 13 pressed from the bottom of the recessed portion 5, as shown in Figs. 3 and 4. These fingers 13 extend parallel with the sides of the base 8 of the nut and, as the sides of the base 8 are straight, they engage the fingers and prevent turning movement of the nut.

While I have shown and described a preferred embodiment of my invention, it will be understood that changes involving omission, substitution, alteration and reversal of parts and even changes in the mode of operation may be made without departing from the scope of my invention, which is best defined in the following claims:

1. A nut installation comprising, in combination, a rigid support presenting an aperture passing therethrough, a one-piece nut having a base portion seated against the inner face of said support and presenting a contractible and expansible head and neck portion passing through the aperture in said support, said nut being internally threaded, a part to be secured to said support and a tapered screw for engagement with the internal threads of the nut to expand said head and neck to lock said nut to the support and secure said part to said support.

2. A nut installation comprising, in combination, a support having a depression formed therein, an aperture in the bottom of said depression, a nut having a resilient head snapped through said aperture from the inner side of said support, means pressed from said support for preventing rotation of the nut relative to the support and fastening means for expanding said nut against the wall surrounding said aperture to lock the nut to the support and secure a part against the outer face of said support.

3. A one-piece nut having an axial bore, said nut being provided with a head, a neck and a base portion, and said head and neck portions being divided by slits which terminate in said base to permit contraction and expansion of said head, said base opposite the ends of said slits being relatively thinner adjacent the bore of the nut than at that portion of the base outside the periphery of said neck, thereby to provide increased resiliency to the head and neck portion and prevent setting thereof.

In testimony whereof, I have signed my name to this specification.

FRED S. CARR.